United States Patent [19]

Chiao-Yueh

[11] Patent Number: 4,758,979
[45] Date of Patent: Jul. 19, 1988

[54] METHOD AND MEANS FOR AUTOMATICALLY CODING AND INPUTTING CHINESE CHARACTERS IN DIGITAL COMPUTERS

[76] Inventor: Lin Chiao-Yueh, No. 16, Lane 93, Shih-Ta Road, Taipei, Taiwan

[21] Appl. No.: 864,565

[22] Filed: May 16, 1986

[30] Foreign Application Priority Data

Jun. 3, 1985 [TW] Taiwan ............... 74102386

[51] Int. Cl.⁴ ............... G06K 9/00; G06F 03/02
[52] U.S. Cl. ............... 382/13; 382/56; 364/900
[58] Field of Search ............... 382/13, 59; 364/200 MS File, 900 MS File; 178/18

[56] References Cited

U.S. PATENT DOCUMENTS

| | | | |
|---|---|---|---|
| 4,365,235 | 12/1982 | Greanias et al. | 382/13 |
| 4,542,526 | 9/1985 | Satoh et al. | 382/13 |
| 4,680,804 | 7/1987 | Kuzunuki et al. | 382/13 |
| 4,684,926 | 8/1987 | Yong-Min | 382/56 |
| 4,685,142 | 8/1987 | Ooi et al. | 382/13 |

OTHER PUBLICATIONS

"Online Handwritten Character Recognition For a Personal Computer System", by Yoshida et al., IEEE Transactions on Consumer Electronics, vol. CE-28, No. 3, Aug. 1982, pp. 202-209.

*Primary Examiner*—Eddie P. Chan
*Attorney, Agent, or Firm*—Lowe, Price, LeBlanc, Becker & Shur

[57] ABSTRACT

A method and means for automatically coding and inputting Chinese characters in digital computers, which method includes the steps of: preparing a writing board and an electro conductive pen as an input device for being electrically connected with a digital computer for handwriting Chinese characters; establishing a counting and coding process for the digital computer for automatically counting and coding any characters handwritten on the writing board with the electro conductive pen; and providing a regional control arrangement in conjunction with the writing board and associated with the counting coding process so as to enable the digital computer to automatically count every stroke and direction of movement of the electro conductive pen; so that any handwritten characters on the writing board can be automatically sorted, counted, coded and processed by the digital computer.

9 Claims, 5 Drawing Sheets

FLOW CHART OF SUB-ROUTINE-300
FIG.4

TABLE 1 SIX EXAMPLES-(B)

| CHINESE CHARACTER | MEANING IN ENGLISH | COUNTED AMOUNT OF EACH DIRECTIONAL GROUP | | | | | | 4 DIGITS CODE |
|---|---|---|---|---|---|---|---|---|
| | | NO.1 | NO.2 | NO.3 | NO.4 | NO.5 | NO.6 | |
| 三 | THREE | 3 | 0 | 0 | 0 | 0 | 0 | 3 0 0 0 |
| 川 | RIVER | 0 | 3 | 1 | 0 | 0 | 0 | 0 3 1 0 |
| 月 | MOON | 3 | 2 | 1 | 0 | 1 | 0 | 3 2 1 F |
| 位 | POSITION | 2 | 1 | 2 | 2 | 0 | 0 | 2 1 2 2 |
| 油 | OIL | 3 | 3 | 0 | 2 | 0 | 1 | 3 3 E D |
| 泳 | SWIM | 2 | 1 | 2 | 4 | 1 | 1 | 2 1 C 4 |

TABLE 2 STATISTICS OF 4 DIGITS CODE OF 4808 CHARACTERS**

| KIND OF CODE | CHARACTERS | | CODES | | DESCRIPTION |
|---|---|---|---|---|---|
| | SINGLE ITEM | TOTAL ACCUMUL. | SINGLE ITEM | TOTAL ACCUMUL. | |
| 1 CHAR. | 40.8 % | 40.8 % | 67.0 % | 67.0 % | 1964 CODES |
| 2 CHAR. | 22.7 | 63.5 | 18.7 | 85.7 | |
| 3 CHAR. | 12.5 | 76.0 | 6.8 | 92.5 | |
| 4 CHAR. | 7.8 | 83.8 | 3.2 | 95.7 | |
| 5 CHAR. | 5.8 | 89.6 | 1.9 | 97.6 | |
| 6 CHAR. | 3.8 | 93.4 | 1.0 | 98.6 | |
| 7 CHAR. | 2.6 | 96.0 | 0.61 | 99.21 | |
| 8 CHAR. | 2.3 | 98.3 | 0.5 | 99.71 | |
| 9 CHAR. | 0.8 | 99.1 | 0.14 | 99.85 | 4 CODES |
| 10 CHAR. | 0.6 | 99.7 | 0.11 | 99.96 | 3 CODES |
| 11 CHAR. | 0. | 99.7 | 0. | 99.96 | |
| 12 CHAR. | 0.3 | 100. | 0.04 | 100. * | 1 CODE |

* TOTAL = 2929 CODES

** THE MOST COMMONLY USED TODAY

TABLE 3 THE WORST CASE OF 4 DIGITS CODES AND THEIR 6 DIGITS CODES

| CHAR-ACTER | RADI-CAL | STRO-KES | SECOND PART COUNT OF GROUP | | 4 DIGITS CODE | 6 DIGITS CODE |
|---|---|---|---|---|---|---|
| | | | NO.1 | NO.2 | | |
| 果 | 木 | 8 | 1 | 1 | 4 3 1 1 | 4 3 1 1 1 1 |
| 某 | 木 | 9 | 1 | 1 | 4 3 1 1 | 4 3 1 1 1 1 |
| 查 | 木 | 8 | 3 | 2 | 4 3 1 1 | 4 3 1 1 3 2 |
| 柑 | 木 | 9 | 3 | 2 | 4 3 1 1 | 4 3 1 1 3 2 |
| 東 | 木 | 8 | 0 | 0 | 4 3 1 1 | 4 3 1 1 0 8 |
| 更 | 日 | 7 | 0 | 0 | 4 3 1 1 | 4 3 1 1 0 7 |
| 足 | 足 | 7 | 0 | 0 | 4 3 1 1 | 4 3 1 1 0 7 |
| 吚 | 口 | 8 | 2 | 1 | 4 3 1 1 | 4 3 1 1 2 1 |
| 味 | 口 | 8 | 2 | 1 | 4 3 1 1 | 4 3 1 1 2 1 |
| 吞 | 口 | 7 | 2 | 2 | 4 3 1 1 | 4 3 1 1 2 2 |
| 歪 | 止 | 9 | 2 | 2 | 4 3 1 1 | 4 3 1 1 2 2 |
| 舍 | 舌 | 8 | 4 | 3 | 4 3 1 1 | 4 3 1 1 4 3 |

TABLE 4 STATISTICS OF 6 DIGITS CODE OF 4808 CHARACTERS * *

| KIND OF CODE | CHARACTERS | | CODES | | DESCRIPTION |
|---|---|---|---|---|---|
| | SINGLE ITEM | TOTAL ACCUMUL. | SINGLE ITEM | TOTAL ACCUMUL. | |
| 1 CHAR. | 82.8% | 82.8% | 91.5% | 91.5% | 3981 CODES |
| 2 CHAR. | 12.6 | 95.4 | 7.0 | 98.5 | |
| 3 CHAR. | 2.9 | 98.3 | 1.1 | 99.6 | |
| 4 CHAR. | 1.3 | 99.6 | 0.3 | 99.9 | 15 CODES |
| 5 CHAR. | 0.4 | 100. | 0.1 | 100. | 4 CODES |

\* TOTAL=4350 CODES

\* \* THE MOST COMMONLY USED TODAY

METHOD AND MEANS FOR AUTOMATICALLY CODING AND INPUTTING CHINESE CHARACTERS IN DIGITAL COMPUTERS

BACKGROUND OF THE INVENTION

This invention relates to a method and means for automatically coding and inputting Chinese characters in digital computers, and more particularly to a method by which any Chinese character can be automatically coded by the computer for being inputted therein by simply handwriting the Chinese characters on a writing board operatively connected to the computer.

At present, no one is content with the prevailing input methods of Chinese characters for digital computer use because all of the known input methods are not only complex but also difficult to operate in the computer. The main reason is that the known input methods for Chinese characters have to fulfill a prerequisite condition, i.e. to manually prepare a coding system and assign each Chinese character a definite code or certain symbol according to the strokes comprising the character, before storing the required characters in the computer. However, as each Chinese character is written with a number of strokes of varying sizes and relative locations, not only is the coding system very complicated but also the input operations are hard to perform because they have to be done through a special keyboard adopted to known input methods, and comprehensive training is required. Therefore, as far as the applicant of this invention is concerned, no known coding approach has solved the problems outlined above.

SUMMARY OF THE INVENTION

It is accordingly a primary object of this invention to provide a method and means for automatically coding and inputting Chinese characters in a digital computer by converting each Chinese character into a digital code through directly handwriting the character to be inputted and processed in the computer.

It is another object of this invention to provide a method and means for automatically coding and inputting Chinese characters in a digital computer by using a a writing board with pen as an input device, which is designed to be able to detect the coordinate value of the pen point whenever the pen nib is placed and moved on the writing board.

It is a further object of this invention to provide a method and means for automatically coding and inputting Chinese characters in a digital computer with a regional control means arranged in conjunction with the input device so as to facilitate the counting and coding operations performed by the digital computer for each character entered from the input device;

It is still another object of this invention to provide a method and means for automatically coding and inputting Chinese characters in a digital computer with a program arranged therein in accordance with the regional control means so as to enable all characters supplied from the input device to be automatically counted and coded for processing in the digital computer.

According to a feature of this invention every moving direction of the pen point in a certain range of regions on the input device is counted and grouped by the digital computer based on vector quantities resulted from the variation of coordinate values of the running pen point. These ranges are hereinafter referred to as "directional groups."

According to another feature of this invention the occurrences of pen movement in each directional group are sorted and coded by the computer.

According to still another feature of this invention a hexadecimal 4-digit code and/or a hexadecimal 6-digit code will be automatically derived by the computer from the counted amount obtained from the number of occurrences of pen movement in each directional group.

According to still another feature of this invention no training, no character analysis and assortment and no knowledge of pronunciation are required for the input operations of the user. Simply handwriting the characters on the input device is necessary and enough.

According to still another feature of this invention there is no quantitative limitation to handle and assemble codes for all the different Chinese characters handwritten on the input device.

According to still another feature of this invention the occurrence of identical codes for different characters in the computer happens very seldom and can be easily handled by the user.

These and other objects and features are achieved by the present invention of a method and means for automatically coding and inputting Chinese characters in a digital computer, which method comprises the steps of: providing an input device to be used as a peripheral unit of a digital computer; supplying the digital computer with a program specifically prepared in conjunction with the input device; establishing a regional control means for counting through the program the total strokes and the moving directions of each stroke of each character in handwriting, supplied from the input device; and entering into the digital computer for any Chinese characters through the input device by means of handwriting the characters therewith; thereby any Chinese character in handwriting form written on the input device can be automatically coded, inputted and processed by the digital computer without requiring any technical training, character analysis, or knowledge of pronunciation from the user. The input device includes a writing board with a matrix of a plurality of tapping contacts of two resistors arranged therein and electrically connected to the digital computer, and an electro-conductive pen operatively connected with the writing board for handwriting Chinese characters therewith so that any written characters can be automatically coded and processed by the digital computer according to the directions of movements of the conductive pen. For facilitating the coding and processing operations of the digital computer (such as an Apple II microcomputer) a regional control means, which controls a combination of six regions for grouping movements of the pen according to six directional groups annularly arranged in 360 degrees on the writing board, matched with a program is provided in connection with the digital computer so as to enable the latter to count all the moving directions of the strokes of a character written on the writing board for automatically coding the character in four to six digits.

Other advantages and characteristics of this invention will become more apparent from the following detailed description with reference to the accompanying drawings and tables.

In addition, four tables and a program called Autocoding 2 are also presented as follows:

Table 1 is a representation of the counted amount of strokes in each directional group and 4-digit codes for each of six Chinese characters performed by the digital computer according to this invention;

Table 2 is a representation of statistics of the 4-digit codes for the most commonly used 4808 Chinese characters according to this invention;

Table 3 is an illustration of the "worst case" duplicated codes in different Chinese characters showing 4-digit codes and 6-digit codes as counted by the computer; and Table 4 is a representation of statistics of 6-digit codes for the most commonly used 4808 Chinese characters according to this invention.

A program named Autocoding 2, which is prepared on the basis of the coding method of this invention to be programmed into a digital computer such as an APPLE II, is attached for reference.

DETAILED DESCRIPTION OF THE INVENTION

The method and means for automatically coding and inputting Chinese characters in digital computers according to this invention is described hereinbelow with reference to FIGS. 1, 2 and 3.

Figure 1:
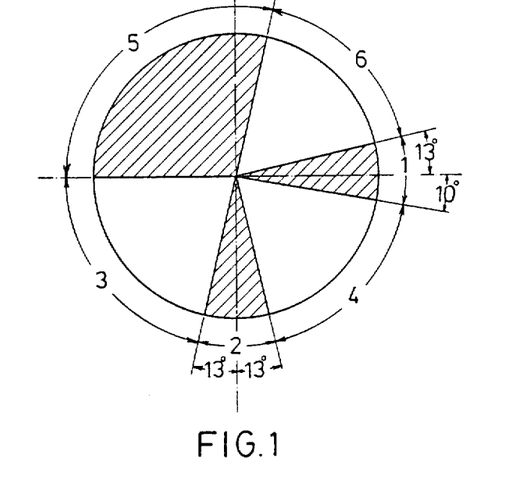
FIG. 1 is an illustrative view of a regional control arrangement in 360 degrees divided in six stroke directional regions defined as directional groups used for coding the handwritten strokes of each Chinese character according to this invention.
Figure 3:
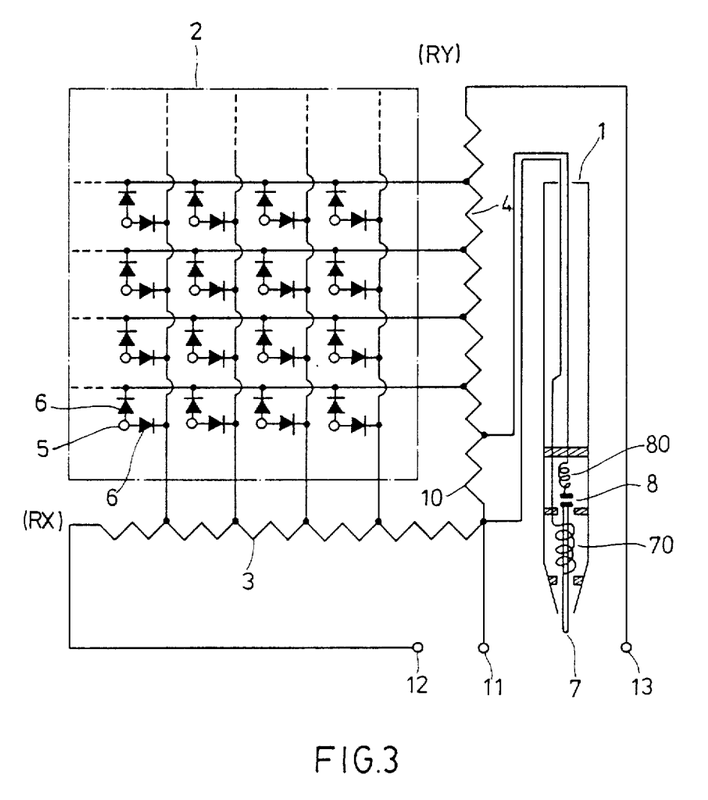
FIG. 3 is a circuit diagram of a preferred embodiment of an input device combined with a writing board and a conductive pen with a matrix of a plurality of tapping contacts electrically connected to a digital computer according to this invention.

Referring to FIG. 1, there is shown a preferred embodiment of a regional control arrangement matched with the input device of FIG. 3 for automatically coding the Chinese characters through a digital computer electrically associated therewith. In FIG. 1 numerals 1 through 6 respectively denote directional writing ranges wherein numeral 1 is the range covered by a first directional group; numeral 2, a second directional group; numeral 3, a third directional group; numeral 4, a fourth directional group; numeral 5, a fifth directional group; and numeral 6, a sixth directional group. The writing strokes of the pen fall into different directional groups according to their shapes and the directions in which they are written, and codes are calculated therefrom. Details will be described in the following paragraphs.

It is important to note that the term "stroke" as used in the following descriptions does not have the same meaning as stroke in describing ordinary script. "Stroke" generally means a single, uninterrupted movement of a pen from the time it touches a writing surface to the time it is lifted therefrom. However, for the purpose of the description below, the meaning of "stroke" is restricted to a movement or a series of movements which are not interrupted by lifting the pen nib from the writing surface of the writing board. Therefore, a single conventional stroke of a Chinese character, which may be angled or hooked, can be said to have one or more stroke directions according to this invention.

Figure 2:
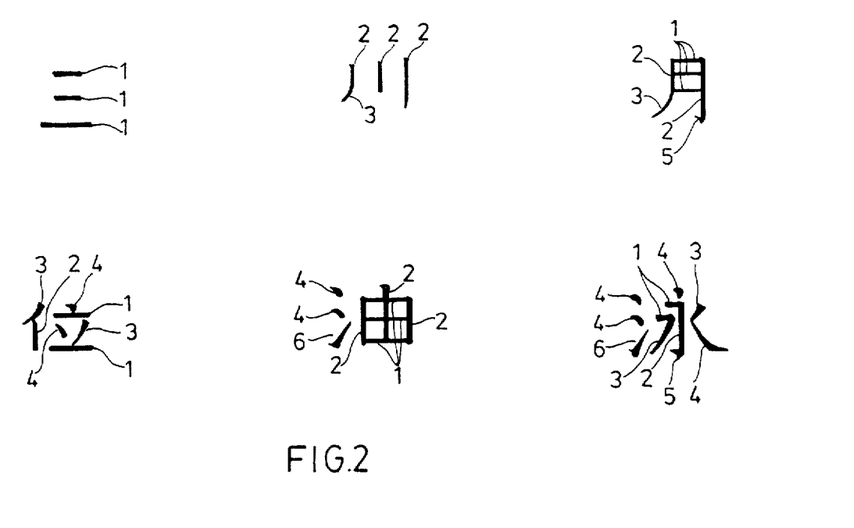
FIG. 2 is a representation of six Chinese characters showing the occurrences of each stroke written in each directional group of FIG. 1.

Firstly, according to the original process by which the Chinese characters were formed for calligraphic purpose, FIG. 1 is expressed by drawing a horizontal stroke " ", drawing two horizontal strokes " " means FIG. 2, and three horizontal " " equal to 3. Therefore, based on this idea, a first step of coding the Chinese character is that the count of strokes in transversal direction equals to the amount of strokes in the first directional group of the regional control arrangement as shown in FIG. 1, and a first digit of the code is calculated consequently.

Secondly, the main elements of Chinese characters are horizontal and vertical strokes. For instance, the character " " (ten) consists of a horizontal stroke and a vertical stroke crossing the horizontal stroke. It is accordingly coded as two digits 11. Following this method, the character " " (king) is coded 31 and the character " " (mouth) as 22. Thus, a second step of coding the Chinese characters is to count vertical strokes as values in longitudinal direction equal to the counted amount of strokes in the second directional group of the regional control arrangement, and a second digit of the code is calculated accordingly.

Thirdly, anyone who writes Chinese characters can easily distinguish horizontal stroke " " and vertical stroke " " from other two basic slanted strokes " " written from top right to bottom left and " " written in reverse from top left to bottom right. For instance, the Chinese character " " (wood) consists of a horizontal stroke, a vertical stroke, a slant and a reverse slant strokes, so it is coded 1111. In like manner, the code for character " " (rest) is 1221, for character " " (eight) is 0011, and so forth. Therefore, a third step of coding the Chinese character is to count slanted strokes in the directional groups with a counted amount equals to that of the third directional group of the regional control arrangement, and to code them with a third digit; while, a fourth step is to count reverse slants in the directional group with a counted amount equals to that of the fourth directional group of the regional control arrangement, and to code them with a fourth digit.

Fourthly, the short stroke referred to as point ( ) in Chinese characters is actually not a point as defined in geometry. In fact, it is a short line, and is written in certain specified directions known to anyone who writes Chinese characters. It is for this reason that points in Chinese characters are dealt in the same way as the longer line strokes, and are coded as the lines in respective directional groups.

4808 Chinese characters, which are the most commonly used ones today, have been checked to see the feasibility of using the above described four coding steps. Several questions were encounted but completely solved as follows:

(1) In some cases, as occurrences of strokes in one directional group exceed nine, an hexadecimal digit system is adopted for the coding digit. However, if the occurrences of strokes in any directional group exceed 15, no more count will be made after the counted amount reaches 15. Using this limit, of the most commonly used 4808 Chinese characters, very few identical codes occur for different characters.

(2) In addition to the four directional groups mentioned above, there are two upward directions in which strokes are written in some Chinese characters, which are dealt with as follows:

Two more directional groups in the regional control arrangement as shown in FIG. 1 are provided for the two upward directions of strokes. One of them, the upward hook stroke, occurs in a vertical upward direction and from the lower right toward the upper left and is counted in a fifth directional group, and a fifth digit is calculated thereat; while, the other upward slant stroke written from lower left hand toward upper right hand in a character is counted in a sixth directional group, and a sixth digit is calculated thereat.

Additional steps are supplemented as follows:

(1) if the counted amount of the sixth directional group is not zero, then add 2 into the counted amount of the fifth directional group;

(2) Add the counted amount of the sixth directional group into the counted amount of the third directional group;

(3) If the resultant amount of the fifth directional group equals 1, then change the counted amount of the fourth directional group to its radix-minus-one complement;

(4) If the resultant amount of the fifth directional group equals 2, then change the counted amount of the fourth directional group and the counted amount of the third directional group to their radix-minus-one complement; and (5) If the resultant amount of the fifth directional group equals 3 or more, than change the counted amount of the third directional group to its radix-minus-one complement.

It shall be appreciated that all the steps of counting and coding the Chinese characters are done by the digital computer through handwriting the characters on input device of this invention, which input device will be described and illustrated hereinafter in the later paragraphs.

Concerning the classification of directional groups as described above, the implied extent of the directional group is sometimes indistinct. For example, the character " " is expected to be in rectangular form, but the actual handwritten character of " " is always a reverse trapezoidal shape. Therefore, an explicit statement about the range of each directional group should be given. After surveying many actual examples, a preferred step is as follows:

As shown in FIG. 1, the four quandrants of the plane rectangular coordinate are divided into regions by six straight demarcation lines, and sorting can be based on the vector quantities resulted from the variation of the coordinate value of the pen point on the writing board. After the division, six directional groups are formed therein. The first directional group covers an anglar range from $-10°$ to $+13°$; the second directional group from $(270°-13°)$ to $(270°+13°)$; the fifth directional group from $(90°-13°)$ to $180°$; the third directional group occupies the residual region of the third quadrant of the coordinates; the fourth directional group occupies the residual region of the fourth quadrant of the coordinates; and the sixth directional group occupies the residual region of the first quadrant of the coordinates. In taking unexpected condition into consideration, the four regions of $13°$ mentioned above can be adjusted within $\pm 3°$, and the counting of the occurrences of each directional group can be done as follows:

Referring to FIGS. 1 and 2, a count 1 can be given at least to each stroke in accordance with the directional group to which the stroke is written. In case the stroke is bent, the directional group occupied by the two adjacent line sections adjoining at the bending point one after another will be compared thereat. If the two line sections belong to a different directional group, a count 1 for the other directional group where the other line section occurs after the bending point will be added. If the two line sections belong to the same directional group, no count will be added.

As shown in FIG. 2 and Table 1, six examples of the characters are counted at each directional group, and the counted amount of each directional group and their coded digits are as shown. In FIG. 2 the digits 1, 2, 3, 4, 5, and 6 denote the directional groups from first through sixth for each stroke the characters are respectively handwritten thereon.

Concerning the directional change of curved strokes, solution is made as follows:

For example, the character " " changes its writing direction three times, so the counted code will be 201F. In this case, the first time it is bent into an acute angle, the second time a curve, and the third time an upward hook. However, it should be noted that the curve resulted from the second bending has two directional groups in itself, i.e. the second directional group and the fourth directional group; therefore, the code 201F can be changed into 211E. The former code 201F is formed by macroscopic means while the latter is formed by microscopic means. According to this invention, 2945 codes for the most commonly used 4808 characters can be formed by macroscopic means, which skips very short parts of strokes, and 2929 codes for the 4808 characters by microscopic means. Since there is no magnificent difference between these two means, either way of code forming can be acceptable.

Regarding the multiplicate codes from one character, particularly the curved strokes in some characters, solution is also provided by this invention. For instance, the last stroke of the character " " might be handwritten in different manner by different writers with a possible result of three different codes such as 202E, 102D, and 112D. To solve this problem, an internal code and an external code will be presented here. The internal code is an exchange code used for telecommunication, and it should be one internal code for one character strictly. The external code is an input code for computer, and it is tolerable that some different characters form the same external code or one character forms several different external codes. When an external code is inputted, it is checked in an internal code list prearranged in order of the external code value. If some different characters form the same external code, so many internal codes will be successively prearranged on the places of the corresponding external code in the list. In case a character forms several different external codes such as the character described above, the internal code can be separately prearranged again on the places of the corresponding external codes in the list. Therefore, there is no problem about the multiplicate codes.

Referring to FIG. 3, there is shown a partial representation of a preferred embodiment of an input device for handwriting operations according to this invention. The input device comprises: an electro conductive pen 1, a writing board 2 having a plurality of diodes 6 and tapping contacts 5 arranged in matrix form; a first resistor element 3 (RX) is tapped to the cathode of each diode 6 vertically arranged in the matrix of the writing board 2 for being used to measure the abscissa value thereof; and a second resistor element 4 (RY) is tapped to the cathode of each diode 6 horizontally arranged in the matrix of the writing board 2 for being used to measure the ordinate value thereof, and both resistor elements 3 and 4 have a common terminal 11, and a first terminal 12 (used for RX only) and a second terminal 13 (used for RY only) for being connected to the digital computer. All the diodes 6 are connected in pair with the cathodes thereof respectively connected with the resistor elements 3 and 4 and the anodes connected together at a tapping contact 5. The total numbers of the contact 5 in the preferred embodiment are $19 \times 19 = 361$ of which only a part is shown in FIG. 3. As to the total number of the diodes 6 arranged in the writing board matrix, there are $2 \times 19 \times 19 = 722$ diodes required in the preferred embodiment, and only a part of them is shown in FIG. 3.

The conductive pen 1 designed for handwriting characters on the writing board 2 includes: a pen nib 7 having a first spring member 70 with one end connected to the internal end of the pen nib 7 and the other end connected to a common terminal 11 of the first and second resistor elements 3 and 4; a contact switch 8 having a second spring member 80 with one end connected to the contact switch 8 and the other end tapped at a proper part of the second resistor element 4.

For the connection and operation of the writing board 2 in association with the digital computer according to this invention, details are as follows:

For example, the three terminals of a game I/O connector of a microcomputer (not shown), such as +5, PDL0, PDL1 socket terminal of APPLE II computer, are respectively connected to the common terminal 11, the first terminal 12 and the second terminal 13 of the writing board 2.

Figure 4:
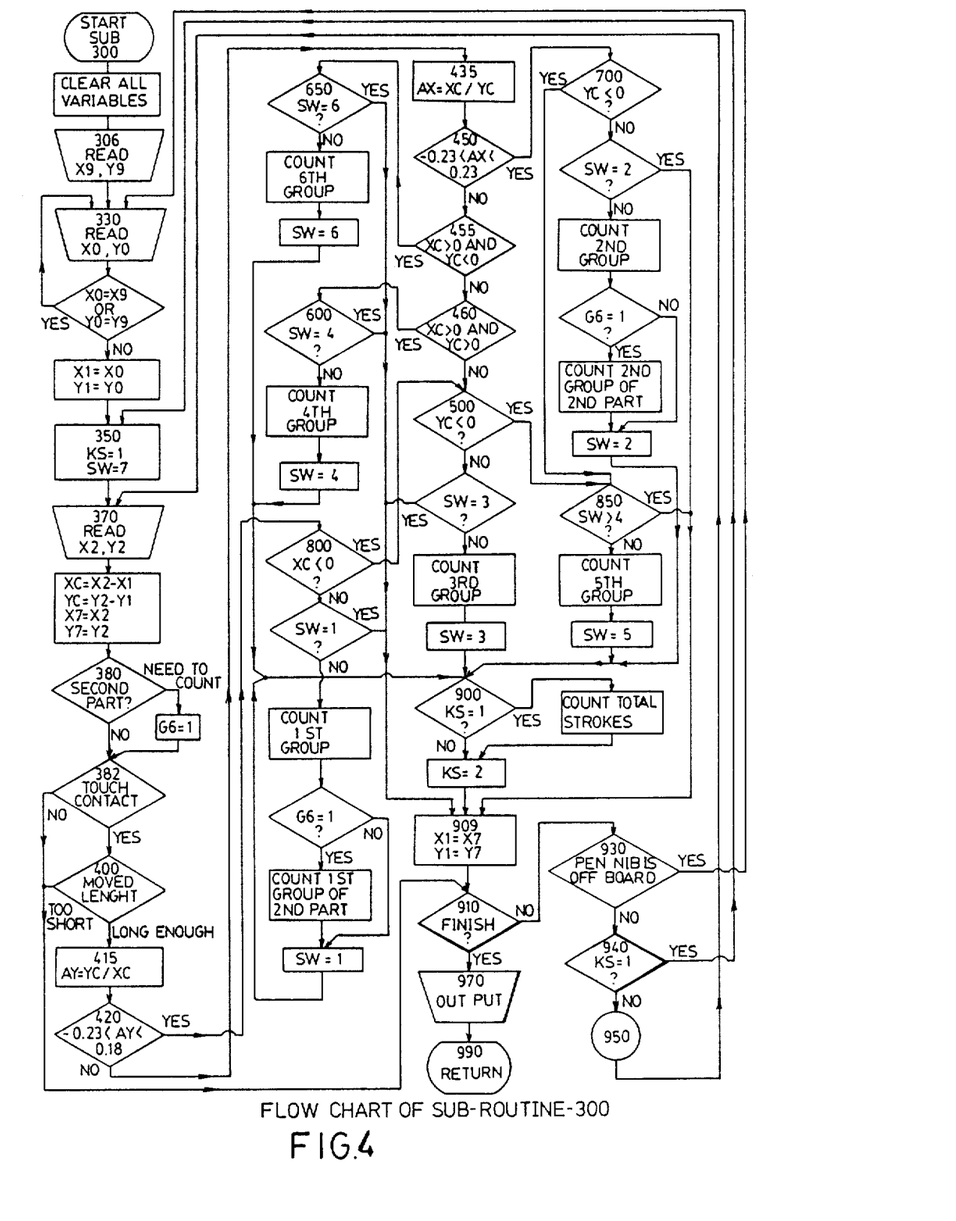
FIG. 4 is a flow chart illustrating the manner in which the digital computer is programmed to count and code the strokes of characters handwritten on the input device according to this invention.

Referring to FIG. 4 and an attached representation of an Autocoding 2 program exemplified according to this invention, when the subject computer is operated under a condition of input with varying resistances, the user can get digital output therefrom in accordance with the input from this input device. For instance, if the computer is running under a BASIC program (as shown in the attached program), the user can get the function of PDL(0) and PDL(1) by means of handwriting a Chinese character with the conductive pen 1 on the writing board 2.

When the pen nib 7 is not placed on the writing board 2, the contact switch 8 is in OFF condition. Though many bridges between RX and RY are formed in the matrix of the writing board 2, no bridge current is developed because each pair of the diodes 6 in series in each bridge is connected in antipodal polarity. Therefore, the resistance of RX and RY is kept at a maximum value, and the two derived coordinate values of the pen nib 7 are also in maximum, that is to say the coordinate values of the pen nib 7 are out of the writing board 2.

When a user starts handwriting, and the pen nib 7 touches an element of the writing board matrix, two branch routes from the touch point will occur with one banch going to RX through a diode and the other branch to RY through another diode of the touched element where the two diodes are connected in parallel and have the same polarities. As the polarity of each diode is arranged in such a way that the resistance thereof will become low in this case. Thus, the resistance between the common terminal 11 and the pen nib 7 is shunted. In this condition the resistance of one route becomes a resistance between the pen nib 7 and the first terminal 12 while the resistance of the other route becomes a resistance between the pen nib 7 and the second terminal 13. As a result, the two routes are in proportion to the coordinate value of the touch point.

If the pen nib 7 does not touch any element of the writing board matrix, conditions are as follows:

When the pen nib 7 is put on the writing board 2, the two springs 70 and 80 are compressed thereat, and then the contact switch 8 will be pressed to an ON condition. As a result of this motion, the contact switch 8 shunts the resistance 10 which is a part of the RY resistor element 4, so that the resistance of the RY route will be decreased from a maximum value to a next lower value; whereas the resistance of the RX route is still kept to a maximum value in this case. From these variations as mentioned above, one can find the fifferent condition between two states of the pen nib 7, one is that the pen nib 7 is not placed on the writing board 2, and the other the pen nib 7 is placed on the writing board 2.

Referring to Table 2, a representation of the statistics of the 4-digit codes for the most commonly used 4808 characters. In the Table the term of "1 char." means that no duplicated (or identical) code exists, and 1964 characters belong to this category, and "2 char." or the rest with the number more than 2 means that one code represents more than one character. As can be seen in the Table, the worst case is one code represents 12 defferent characters, which can be displayed in a row on the CRT, so it is tolerable for the user to make a selection thereat. However, in order to improve the duplication problem of the 4-digit coding, a 6-digit coding method is found very successful as follows (as shown in Table 3):

a. The total number of strokes of the character is expressed in two hexadecimal digits, then they are placed after the 4-digit code to make a hexadecimal 6-digit code.

b. If a Chinese character can be divided in two parts, a first one and a second one in writing sequence, provided one of them is a radical of the character, the occurrences of the first directional group and the occurrences of the second directional group of the second part can be counted. The two counted amount of the two groups of the second part are expressed in two hexadecimal digits, and then are placed after the 4-digit code to make a hexadecimal 6-digit code thereat.

c. On the other hand, some Chinese characters cannot be divided into two parts according to the writing sequence. Even if a character can be divided into two parts, it might happen that no first and second directional groups exist in the second part. If both of them are zeros, then the code described in "a" should be given; otherwise, the code variation described in "b" above should be adopted.

Shown in Table 3 is a partial comparison made between the worst case of 4-digit codes and their corresponding 6-digit codes. As can be clearly seen from the Table, the 6-digit coding method has made a great improvement over the 4-digit coding method.

Referring to Table 4, a representation of a statistics of the 6-digit code for the most commonly used 4808 characters. From the Table one can find that the condition of the duplicated code is much improved. The term of "1 char." in the Table means that no duplication code exists, and 3981 characters belong to this categrory, which is 82.8% of the total characters. The rest with more than "1 char." means that one code represents more than one cahracter. However, the "worst case" in this 6-digit code method is only one code representing 5 different characters.

Referring to the program Autocoding 2 and FIG. 4, the main part of the program is a subroutine started from label No. 300 to label No. 990. There are three main loops in the subroutine. The first one starts from label No. 330 to label No. 930, and it will be run once for each stroke of a character handwritten on the writing board 2.

The second loop starts from label No. 350 to label No. 940. The purpose of this loop is to get the directional group which occurs at an initial stage of each stroke. Before the object is attained, the loop will be run again and again.

The third loop starts from label No. 370 to label No. 950. The purpose of this loop is to get the directional group of the second stage and the succeeding directional groups if they are presented from the writing board. The third loop can be stopped by only a way of leaving the conductive pen 1 from the writing board 2. This condition is shown in label No. 930, and the variable X7 and Y7 are the latest coordinate values while the X9 and Y9 are the maximum coordinate values.

Once a count of any directional group is obtained, the program goes to label No. 900. If the conductive pen 1 does not touch any element of the writing board matrix as indicated in label No. 382, the program will jump to label no. 910.

In case the pen nib 7 does not move as indicated in label No. 400, the program will jump to label No. 910 too.

The X1 and Y1 shown in label Nos. 330, 332, 340, 374 are the coordinate values of the starting point of the pen nib 7, and X2 and Y2 are the values of the ending point of moving of the pen nib 7. XC and YC shown in label Nos. 358, 374 are the variation of coordinate values resulted from the movement of the pen point, and XA, YA shown in label Nos. 385, 400 are their absolute values.

The tangent AY shown in label No. 415 and the cotangent AX shown in label No. 435 of the vector due to the moving of the pen point are calculated for classification of the directional groups.

The classification of the first directional group is done depending on whether the AY value is in the assigned range as shown in label No. 420, and then it will be rejected if the variation value of the abscissa XC is minus as shown in label No. 800. The count of the first directional group CN(1) is calculated in label No. 820.

The classification of the second directional group is done by seeing whether the AX value is in the assigned range as shown in label No. 450, and then it will be rejected if the variation value of ordinate YC is minus as shown in label No. 700. It shall be noted that the program adopts downward direction to be in positive value of the ordinate as shown in label No. 23. The count of the second directional group CN(2) is calculated in label No. 720.

After the classification of the first and second directional groups, which take priority over other groups, the classification of the third through the sixth directional groups are done by seeing whether the two components of the vector XC and YC are positive or negative values.

The sixth directional group is classified in label No. 455, and the count of the sixth directional group CN (6) is calculated in label No. 660.

The fourth directional group has both positive values of XC and YC, and it is classified in label No. 460. The count of the fourth directional group CN(4) is shown in label No. 610.

The fifth directional group includes three parts: the first part has a same tangent value AY as that of the first directional group, but the XC and YC are less than zero as shown in label Nos. 420, 800 and 500; the second part of it also has a same cotangent value AX as that of the second directional group, but the YC is a negative value in this case as shown in label Nos. 450 and 700; and the third part has both negative values of XC and YC as shown in label Nos. 455, 460 and 500. The count of the fifth directional group CN(5) is shown in label No. 855.

As to the last step, the direction which has not been picked up yet by the program belongs to the third directional group. The count of the third directional group NC(3) is calculated in label No. 520.

If a detected direction of the stroke handwritten on the writing board 2 belongs to the same directional group of the preceding direction in the same stroke, no count will be added, and then the program will jump to label No. 909 as shown in label Nos. 510, 600, 650, 710 and 810.

The total strokes of a character CN(0) are calculated in label No. 900.

In case a 6-digit code is desired by means of division as hereinbefore described in paragraph b (on page 19), one has to put the conductive pen 1 on the right upper corner of the writing board 2 before one begins to handwrite the second part of the character as indicated in label Nos. 48 and 49. As a result of this action, a control variable G6 will change the value from 0 to 1 as shown in label No. 380, and then the count of the first and second directional groups of the second part of the character CN(7), CN(8) will be calculated as shown in label Nos. 825 and 725.

The subroutine started from label No. 1050 to label No. 1100 shows how to assemble the 4-digit code and the 6-digit code. The program will go to label No. 1061 when the method mentioned in the above paragraph "b" is adopted. If both counts of the first and second directional groups of the second part are zero, or the method hereinbefore described in paragraph (a) is adopted, the program will go to label Nos. 1063 and 1064.

The forgoing is considered as illustrative only of the principles of this invention. Further, since numerous modifications and changes will readily occur to those skilled in the art, it is not desired to limit this invention to the exact method and operation shown and described, and accordingly, all suitable modifications and equivalents may be resorted to, fall within the scope of this invention as claimed.

I claim:

1. A method for automatically coding and inputting Chinese characters into a digital computer using an input means with a peripheral writing device electrically connected to the digital computer, comprising the steps of:
    (a) entering Chinese characters into the digital computer by means of handwriting said characters on said input means regardless of writing sequence of strokes being inputted;

(b) detecting location information of a writing point of said writing device when handwriting a character on said inputting means, said information including down and up motions and coordinate values of each line segment of strokes of the character when the writing point of said writing device is placed and moving on said input means;

(c) calculating all moving directions of the writing point of said writing device based on vector quantities resulting from variations of abscissa and ordinate values on said input means;

(d) classifying each calculated moving direction of the writing point into one directional group among six predetermined directional groups by defining six controlling angular regions;

(e) counting stroke occurrences handwritten on said input means and directional occurrences of each one of said six predetermined directional groups; and (f) coding a predetermined amount of said directional occurrences of each one of said six directional groups and a total amount of stroke occurrences into a plurality of hexadecimal digital code representing the inputted Chinese character.

2. A method according to claim 1, wherein said step (d) of classifying each calculated moving direction of the writing point into one direction of six predetermined directional groups further comprises the steps of:
defining a start point of moving direction in question as an origin of a rectangular coordinate plane; and
dividing four quadrants of said rectangular coordinate plane into six regions by six straight demarcation lines, said lines drawn from the origin of the coordinates to obtain six directional groups with a first directional group covering an angular range of from $-10°$ to $+13°$ on the condition that rightward direction is defined as $0°$ and a positive angle denotes counterclockwise rotation, a second directional group of from $(270°-13°)$ to $(270°+13°)$, a fifth directional group of from $(90°-13°)$ to $180°$, a third directional group occupying a residual region of a third quadrant of the coordinate plane, a fourth directional group occupying a residual region of a fourth quadrant of the coordinate plane, and a sixth directional group occupying a residual region of a first quadrant of the coordinate plane, wherein the four regions of said $13°$ can be adjusted within $\pm 3°$.

3. A method as in claim 1 wherein said step (e) of counting stroke occurrences and directional occurrences further comprises the steps of a counting process as follows:
at least one count being given for each stroke in accordance with the directional group to which the stroke belongs;
in the case where a stroke is bent, two adjacent line sections are detected thereof, wherein one line section precedes a bending point and the other in succeeding will be compared with the directional group to which it belongs;
if said two line sections belong to different directional groups, a count 1 for the other directional group where the other line section occurs after the bending point is added;
in the case that said two line sections belong to a same directional group, no count is added; and
when the directional occurrences in any directional group exceeds 15, no count is added to the directional group.

4. A method as in claim 1 wherein said step (f) of coding a predetermined amount of said directional occurrences and a total amount of stroke occurrences further comprises the steps of forming a 4-digit code as follows:
coding a counted amount of each said directional group with an hexadecimal digit;
if a predetermined amount of said sixth directional group is not in a zero state, adding a predetermined value to the counted amount of said fifth directional group;
adding the counted amount of said sixth directional group to a counted amount of said third directional group;
changing a resultant counted amount of any said directional groups from the first through the fourth to its radix-minus-one complement in accordance with a prearranged order depending on said resultant counted amount of said fifth directional group; and
arranging four resultant values of said directional groups from the first to the fourth in group sequence to make a hexadecimal 4-digit code, which can also be expresed in a binary 16-bit code; so that all directional occurrences present in said directional groups can be completely coded and processed by the digital computer.

5. A method as in claim 4 wherein said step (f) of coding a predetermined amount of said directional occurences and a total amount of stroke occurrences further comprise the steps of forming a 6-digit code as follows:
assigning two hexadecimal digits denoting the total amount of strokes;
placing said two hexadecimal digits after said hexadecimal 4-digit code so as to make a hexadecimal 6-digit code; and
in cases where a binary digit code is adopted, the total amount of strokes being expressed in 8 bits said 8 bits placed after said 16-bit code; whereby said 16-bit code becomes a binary 24-bit code.

6. A method as in claim 4 wherein said steps of forming a 4-digit code further comprise the steps of:
dividing a character into first and second parts in order of writing sequence when one of said parts is a radical of the character;
counting the directional occurrences of said second part in said first directional group and said second directional group;
assigning two hexadecimal digits to denote the two predetermined amounts of the two directional groups of said second part after said 4-digit code to make a hexadecimal 6-digital code; and
in cases where a binary digit code is adopted, expressing the two counted amounts of said two directional groups of said second part a 8 bits said 8 bits placed after said 16-bit code whereby said 16-bit code becomes a binary 24-bit code accordingly.

7. An apparatus according to claim 1 wherein said input means comprises:
a writing board having a plurality of electrical elements arranged in a matrix form;
first and second resistor elements including first and second ends;
said first resistor element electrically connected to said electrical elements of said writing board for forming a first route used for measuring abscissa value of said writing board;

said second resistor element electrically connected to said electrical elements of said writing board for forming a second route used for measuring ordinate value of said writing board, said first and second resistor ends electrically connected with each other at a common terminal and said second ends electrically connected to a digital computer; and said apparatus further comprising an electro-conductive writing device including lead wires respectively connected to said common terminal and said second resistor elements for performing handwriting operations therewith; whereby, all Chinese characters can be inputted.

8. An apparatus according to claim 7 wherein each of said electrical elements is arranged in a matrix form on the writing board, said board including at least one electrical contact; each electrical contact comprising two branch lines, one of said branch lines being tapped from said first resistor element and used to measure the abscissa through a diode of paired diodes, and the other of said branch lines being tapped from said second resistor element used to measure the ordinate through another diode of said paired diodes; whereby, when said conductive writing device touches a contract of an electrical element of said matrix, a part of each said resistor element can be shunted simultaneously so that resistance of said first route becomes proportional to the abscissa value and resistance of said second route becomes proportional to the ordinate value.

9. An apparatus according to claim 7 wherein said electro-conductive writing device comprises an electro-conductive pen, which includes:

a pen body, said body comprising front and end portions;

a pen nib installed in said end portion of said pen body for writing characters on said writing board;

a first elastic member with one end connected to an internal end of the pen nib and another end electrically connected to said common terminal of said first and second resistor element;

a contact switch installed in said front portion of the pen body with one contact connected to said internal end of the pen nib; and a second elastic member with one end connected to another contact of the contact switch an another end electrically tapped at a predetermined part of said second resistor element; whereby, whenever said pen nib touches and is pressed on said writing board or makes any movement thereon during handwriting, a small part of said second resistor element is shunted by said contact switch.

* * * * *